United States Patent
Liu et al.

(10) Patent No.: US 12,338,831 B2
(45) Date of Patent: Jun. 24, 2025

(54) OSCILLATING FAN CONTROL SYSTEM AND CONTROL METHOD THEREOF

(71) Applicant: AC Infinity Inc., City of Industry, CA (US)

(72) Inventors: Jimmy Liu, Brea, CA (US); Daniel Yu Hsu, Upland, CA (US); Wilbur Y. Cheng, Chino Hills, CA (US); Wei Ying Shao, Alhambra, CA (US)

(*) Notice: Subject to any disclaimer, the term of this patent is extended or adjusted under 35 U.S.C. 154(b) by 137 days.

(21) Appl. No.: 18/384,293

(22) Filed: Oct. 26, 2023

(65) Prior Publication Data

US 2025/0137461 A1    May 1, 2025

(51) Int. Cl.
*F04D 27/00* (2006.01)
*H02P 8/20* (2006.01)

(52) U.S. Cl.
CPC ............... *F04D 27/00* (2013.01); *H02P 8/20* (2013.01)

(58) Field of Classification Search
CPC ...... H02P 8/00; H02P 8/02; H02P 8/04; H02P 8/06; H02P 8/10; H02P 8/18; H02P 8/22; H02P 8/24; H02P 8/30; H02P 8/40; H02P 6/00; H02P 6/16; H02P 6/22; H02P 6/30; H02P 8/20
See application file for complete search history.

(56) References Cited

FOREIGN PATENT DOCUMENTS

JP    2018204559 A  * 12/2018 ............. F04D 27/00

OTHER PUBLICATIONS

"Furuya Shigeru et al., Electric Fan, Dec. 27, 2018, Clarivate Analytics, pp. 1-40" (Year: 2018).*

* cited by examiner

*Primary Examiner* — Antony M Paul
(74) *Attorney, Agent, or Firm* — Tommy S F Wang; Wang IP Law Group, P.C.

(57) ABSTRACT

An oscillating fan control system includes a holder, a stepper motor, a rotating shaft, a shaft encoder, and a controller. The controller is electrically coupled to the stepper motor and the shaft encoder. The shaft encoder can generate a status signal corresponding to a rotation path of the rotating shaft. The controller includes a reversing circuit and a driving circuit. The reversing circuit can generate a reversing signal for the stepper motor in response to the status signal indicating a deviation of the rotating shaft from a midpoint position of the rotation path. The driving circuit can generate pulse signals for the stepper motor according to a subdivision parameter and an oscillation angle. A method for controlling an oscillating fan is also disclosed.

10 Claims, 12 Drawing Sheets

OSCILLATING FAN CONTROL SYSTEM AND CONTROL METHOD THEREOF

FIELD OF THE INVENTION

The present invention generally relates to an electric fan and, more particularly, to an oscillating fan.

BACKGROUND OF THE INVENTION

Oscillating fans have gained popularity due to their ability to maintain consistent and widespread airflow, enhancing the overall comfort of indoor environments. Additionally, this innovation aligns with the growing emphasis on energy efficiency, as these fans optimize air circulation while minimizing unnecessary power consumption.

However, conventional oscillating fans are typically configured to oscillate through their entire range once activated. They adhere to an unalterable pattern that culminates in reaching their maximum oscillation angle.

SUMMARY OF THE INVENTION

In order to overcome the disadvantages associated with the aforementioned electric fans, an oscillating fan control system is disclosed. The oscillating fan control system includes a holder, a stepper motor, a rotating shaft, a shaft encoder, and a controller. The stepper motor is secured to the holder. The controller is electrically coupled to the stepper motor and the shaft encoder. The holder has an opening. The stepper motor has an output shaft towards the opening. The rotating shaft has an end towards the opening. The end is connected to the output shaft. The shaft encoder can generate a status signal corresponding to a rotation path of the rotating shaft. The controller includes a reversing circuit and a driving circuit. The reversing circuit can generate a reversing signal for the stepper motor in response to the status signal indicating a deviation of the rotating shaft from a midpoint position of the rotation path. The driving circuit can generate pulse signals for the stepper motor according to a subdivision parameter and an oscillation angle.

The oscillating fan control system may be configured such that the shaft encoder includes a rotating disk and a sensor circuit. The rotating disk is coaxially mounted on the rotating shaft. The sensor circuit is near the opening. The sensor circuit includes two photoelectric sensors spaced apart and oriented towards the rotating disk. The status signal includes different quadrature signals from each of the two photoelectric sensors when obstructed and when unobstructed by the rotating disk.

The oscillating fan control system may further include a control input. The control input has an input circuit and a button. The input circuit can generate the oscillation angle selected by operating the button from a plurality of preset oscillation ranges.

The oscillating fan control system may further include a status display for indicating the oscillation angle.

The oscillating fan control system may be configured such that the stepper motor is driven by a two-phase four-wire excitation, and the subdivision parameter ranges from 4 to 32.

In another aspect, a method for controlling an oscillating fan is provided. The method includes steps of generating pulse signals to a stepper motor according to a subdivision parameter and an oscillation angle, receiving a status signal corresponding to a rotation path of a rotating shaft, and analyzing the status signal to determine if the rotating shaft deviates from a midpoint of the rotation path when the stepper motor is initially started.

The step of analyzing the status signal may further include generating a reversing signal when the rotating shaft deviates from the midpoint.

The method may further include a step of receiving the oscillation angle generated by an input circuit and selected from a plurality of preset oscillation ranges.

The method may further include a step of indicating the oscillation angle by a status display.

The step of receiving the pulse signals may further include collecting different quadrature signals generated by two photoelectric sensors when obstructed and when unobstructed by a rotating disk.

BRIEF DESCRIPTION OF THE DRAWINGS

The drawings illustrate examples. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF THE PREFERRED EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
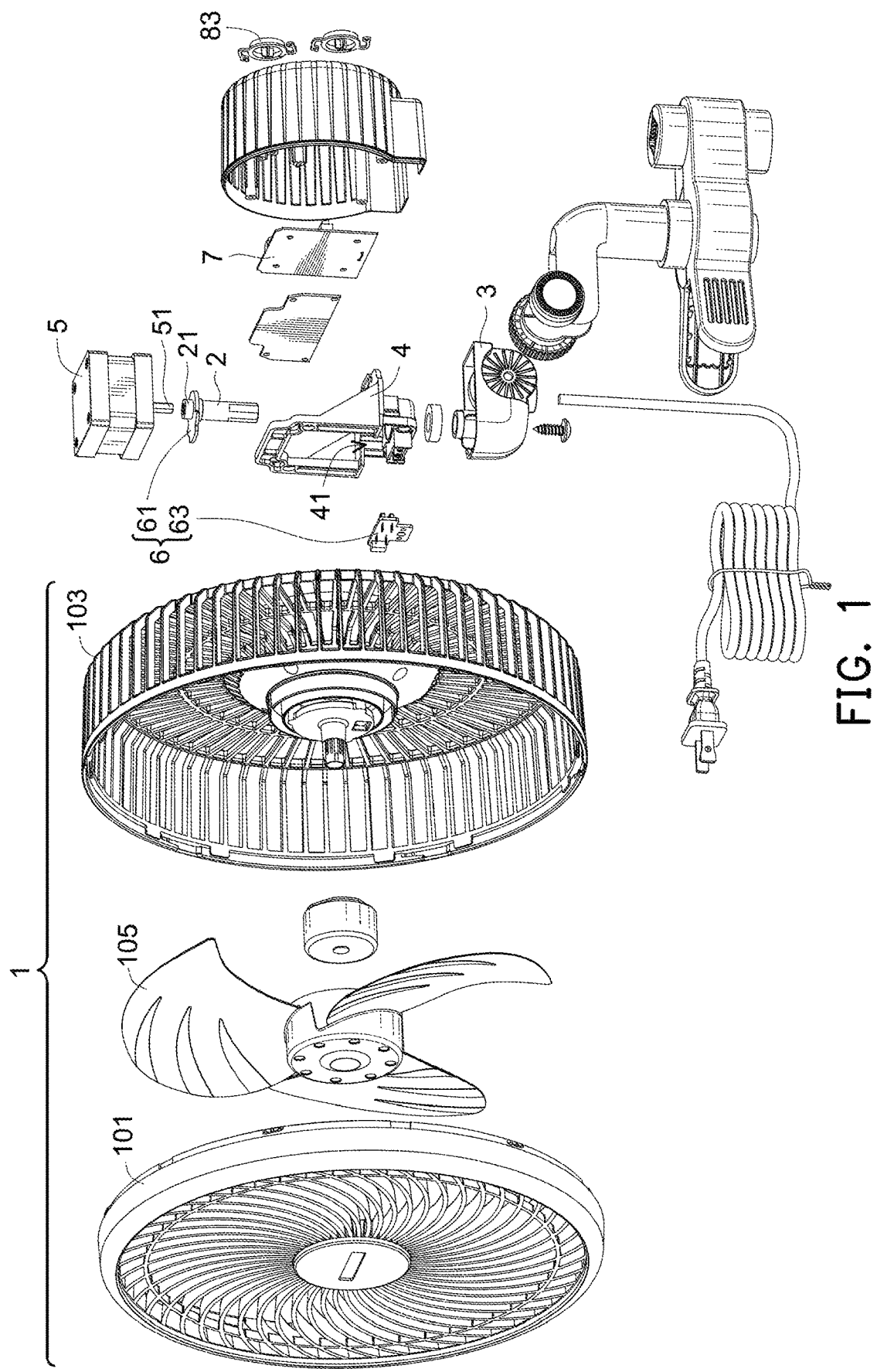
FIG. 1 shows an exploded perspective view of an embodiment of an oscillating fan control system for a fan.
Figure 2:
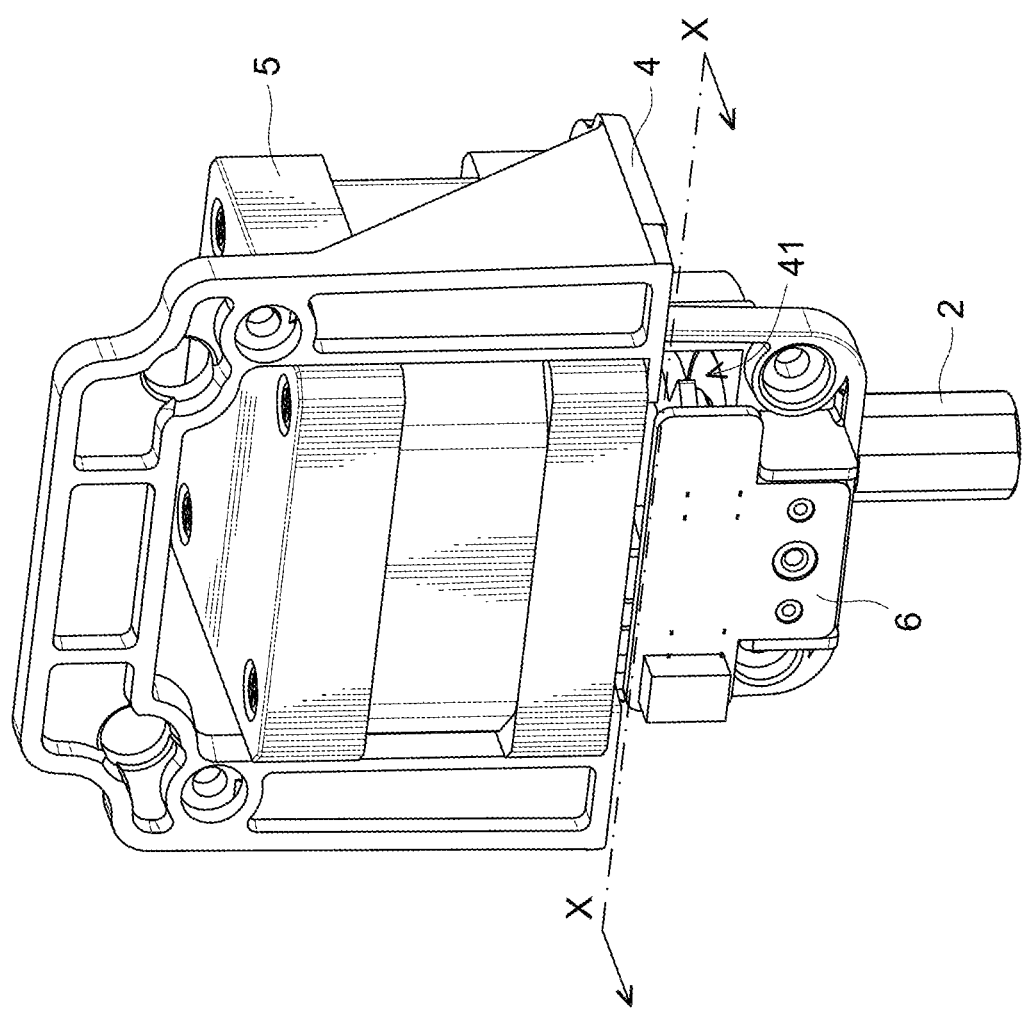
FIG. 2 shows a perspective view of the oscillating fan control system shown in FIG. 1.
Figure 3:
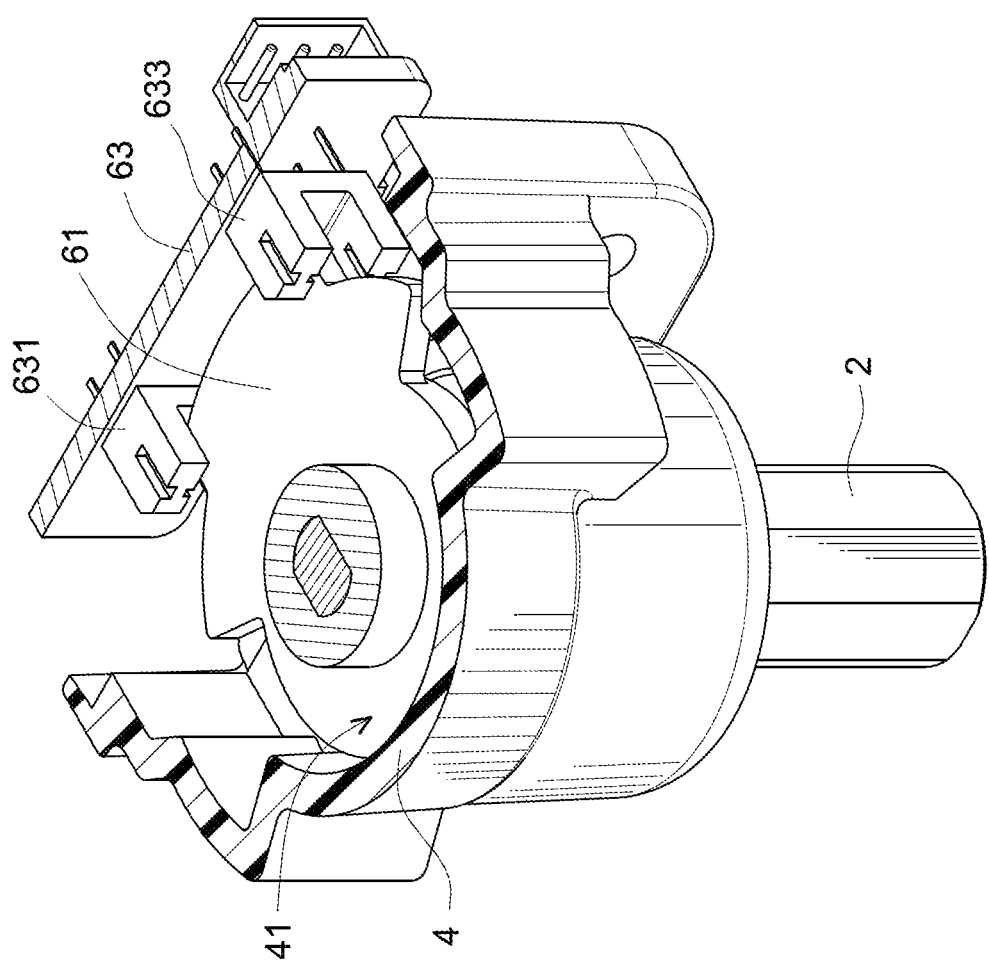
FIG. 3 shows a cross-sectional view along section X-X of FIG. 2.

FIG. 1 shows an exploded perspective view of an embodiment of an oscillating fan control system for a fan. FIG. 2 shows a perspective view of the oscillating fan control system shown in FIG. 1. FIG. 3 shows a cross-sectional view along section X-X of FIG. 2.

Referring to FIGS. 1 to 3 together, in the embodiment, the fan includes a fan head 1, a rotating shaft 2, a base 3, and an oscillating fan control system. The fan head 1 is rotatably secured to the base 3 through the rotating shaft 2. The fan head 1 includes a front cover assembly 101, rear cover assembly 103, and fan blade assembly 105. The rear cover assembly 103 is connected to the front cover assembly 101, accommodating the fan blade assembly 105 inside.

The oscillating fan control system includes the rotating shaft 2, a holder 4, a stepper motor 5, a shaft encoder 6, and a controller 7. The holder 4 is secured to the rear cover assembly 103. The holder 4 has an opening 41 for receiving the rotating shaft 2. The stepper motor 5 is secured to the holder 4. The controller 7 is electrically coupled to the stepper motor 5 and the shaft encoder 6.

The stepper motor 5 has an output shaft 51. The output shaft 51 extends towards the opening 41 and connects to an end 21 of the rotating shaft 2. In other words, the rotating shaft 2 extends into the holder 4 and connects to the stepper motor 5.

Figure 4:
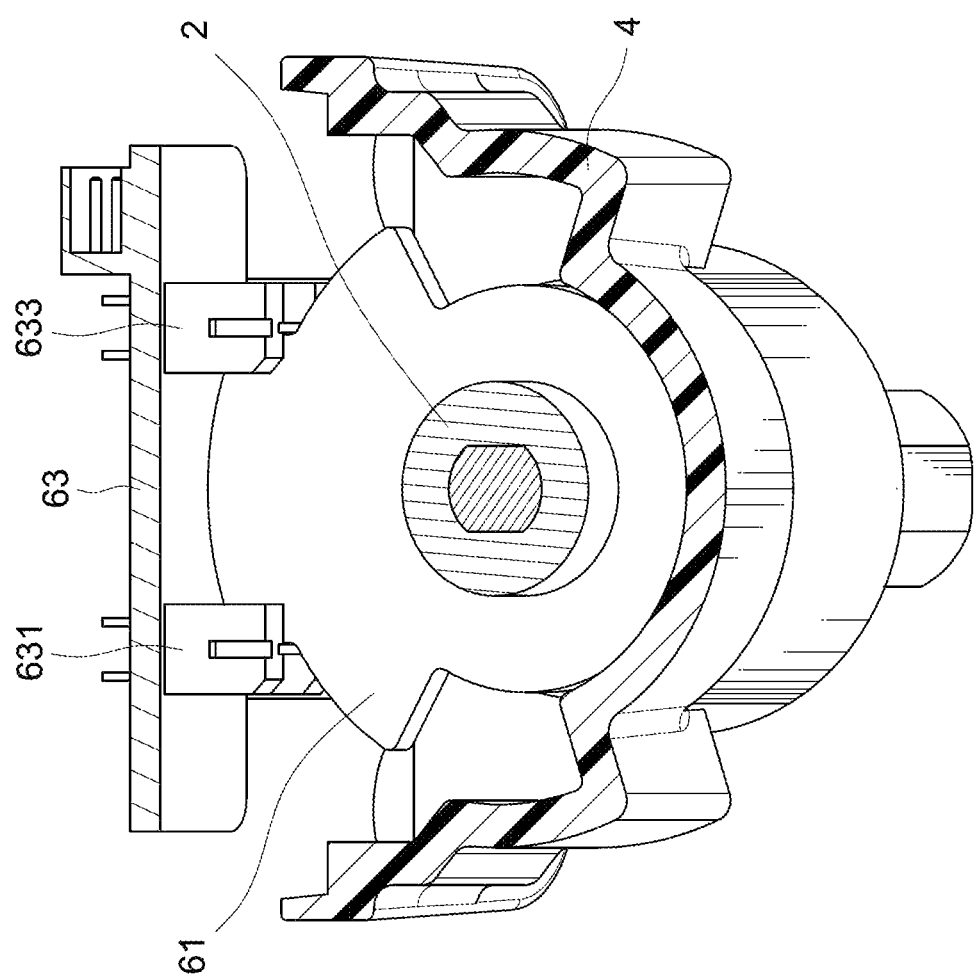
FIG. 4 shows a cross-sectional view along section X-X of FIG. 2, wherein the rotating shaft is at the midpoint position of the rotation path and two photoelectric sensors are obstructed by the rotating disk.
Figure 5:
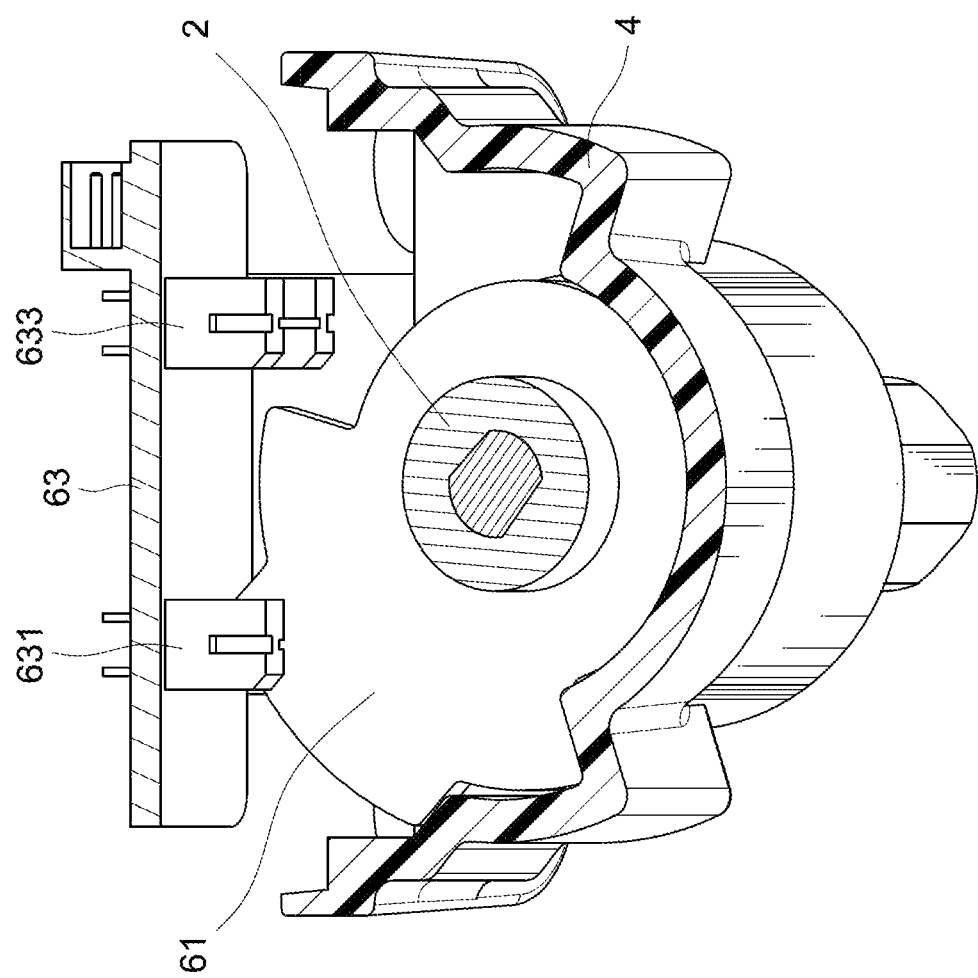
FIG. 5 shows a cross-sectional view along section X-X of FIG. 2, wherein the rotating shaft is rotated to the left end position of the rotation path and the left photoelectric sensor is obstructed by the rotating disk.
Figure 6:
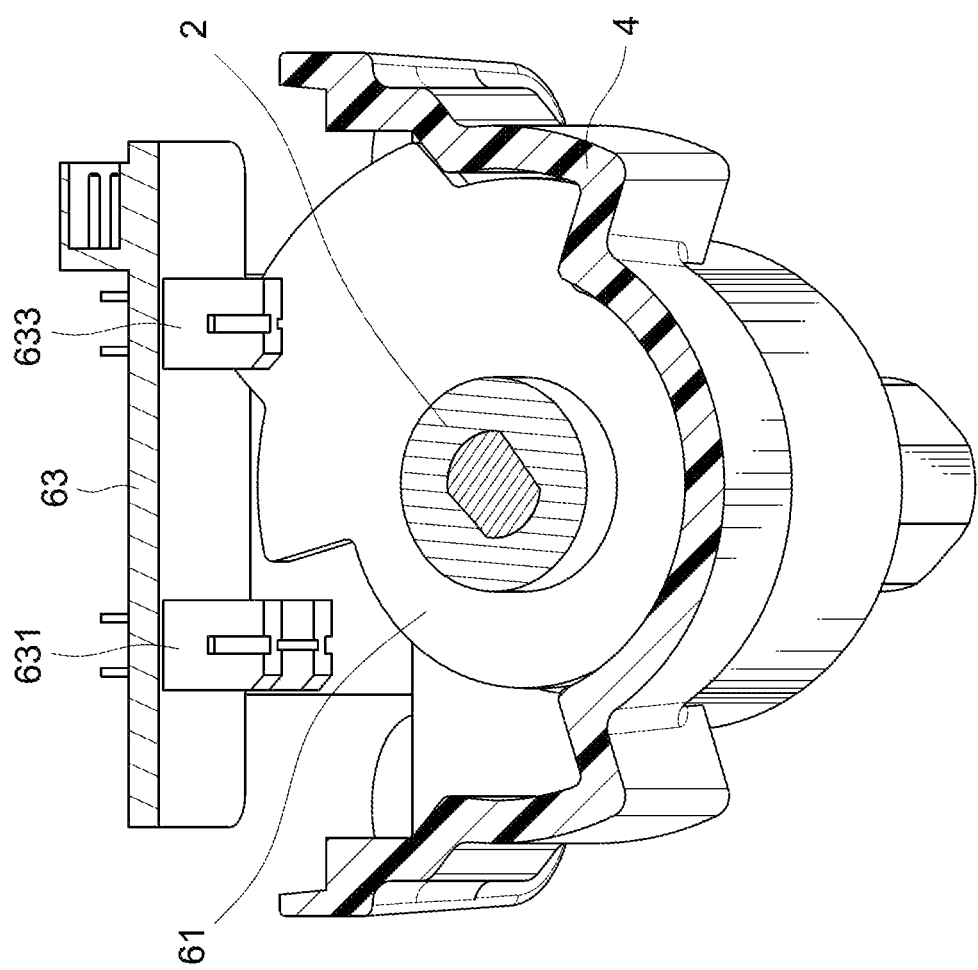
FIG. 6 shows a cross-sectional view along section X-X of FIG. 2, wherein the rotating shaft is rotated to the right end position of the rotation path and the right photoelectric sensor is obstructed by the rotating disk.

FIGS. 4 through 6 are cross-sectional views along the section X-X of FIG. 2. The rotating shaft is at the midpoint position of a rotation path shown in FIG. 4, is rotated to the left end position of the rotation path shown in FIG. 5 and is rotated to the right end position of the rotation path shown in FIG. 6.

Referring to FIGS. 2 to 6 together, the shaft encoder 6 is attached to the holder 4. The rotating shaft 2 rotates either clockwise or counterclockwise within the range of a predetermined oscillation angle. The shaft encoder 6 can generate a status signal corresponding to a rotation path of the rotating shaft 2. This allows the shaft encoder 6 to accurately and quickly locate a midpoint position of the rotating shaft 2.

In some embodiments, the shaft encoder 6 can be an angular transducer for measuring the angular positions of the rotating shaft 2 as the fan head 1 rotates relative to the base 3.

Referring to FIG. 3 again, in the embodiment, the shaft encoder 6 includes a rotating disk 61 and a sensor circuit 63. The rotating disk 61 is coaxially mounted on the rotating shaft 2. The sensor circuit 63 includes two photoelectric sensors 631, 633 disposed on a printed circuit board. In one embodiment, the photoelectric sensors 631, 633 can be implemented by photodiodes.

The two photoelectric sensors 631, 633 are separated from each other and oriented towards the rotating disk 61. The separation distance of the two photoelectric sensors 631, 633 is adaptively determined according to a protrusion element extending from the rotating disk 61. Each of the two photoelectric sensors 631, 633 can generate different quadrature signals when obstructed and when unobstructed by the rotating disk.

For example, referring to FIG. 4, the rotating shaft 2 is at the midpoint position of the rotation path and two photoelectric sensors 631, 633 are obstructed by the rotating disk 61. Thus, the two photoelectric sensors 631, 633 can both generate quadrature signals as "0."

Referring to FIG. 5, the rotating shaft 2 is rotated to the left end position of the rotation path and only the left photoelectric sensor 631 is obstructed by the rotating disk 61. Thus, the left photoelectric sensor 631 can generate a quadrature signal as "0" whereas the right photoelectric sensor 633 can generate another quadrature signal as "1."

Referring to FIG. 6, the rotating shaft 2 is rotated to the right end position of the rotation path and only the right photoelectric sensor is obstructed by the rotating disk 61. Thus, the left photoelectric sensor 631 can generate a quadrature signal as "1" whereas the right photoelectric sensor 633 can generate another quadrature signal as "0."

As such, the sensor circuit 63 can generate the status signal based on different quadrature signals, such as, "00" for FIG. 4, "01" for FIG. 5, and "10" for FIG. 6. This allows the controller 7 to precisely and quickly locate the midpoint along with the sequence of 10-00-01 signals, avoiding mechanical parts hitting with each other at the motor ends where the rotating shafts 2 are started initially.

Figure 7:
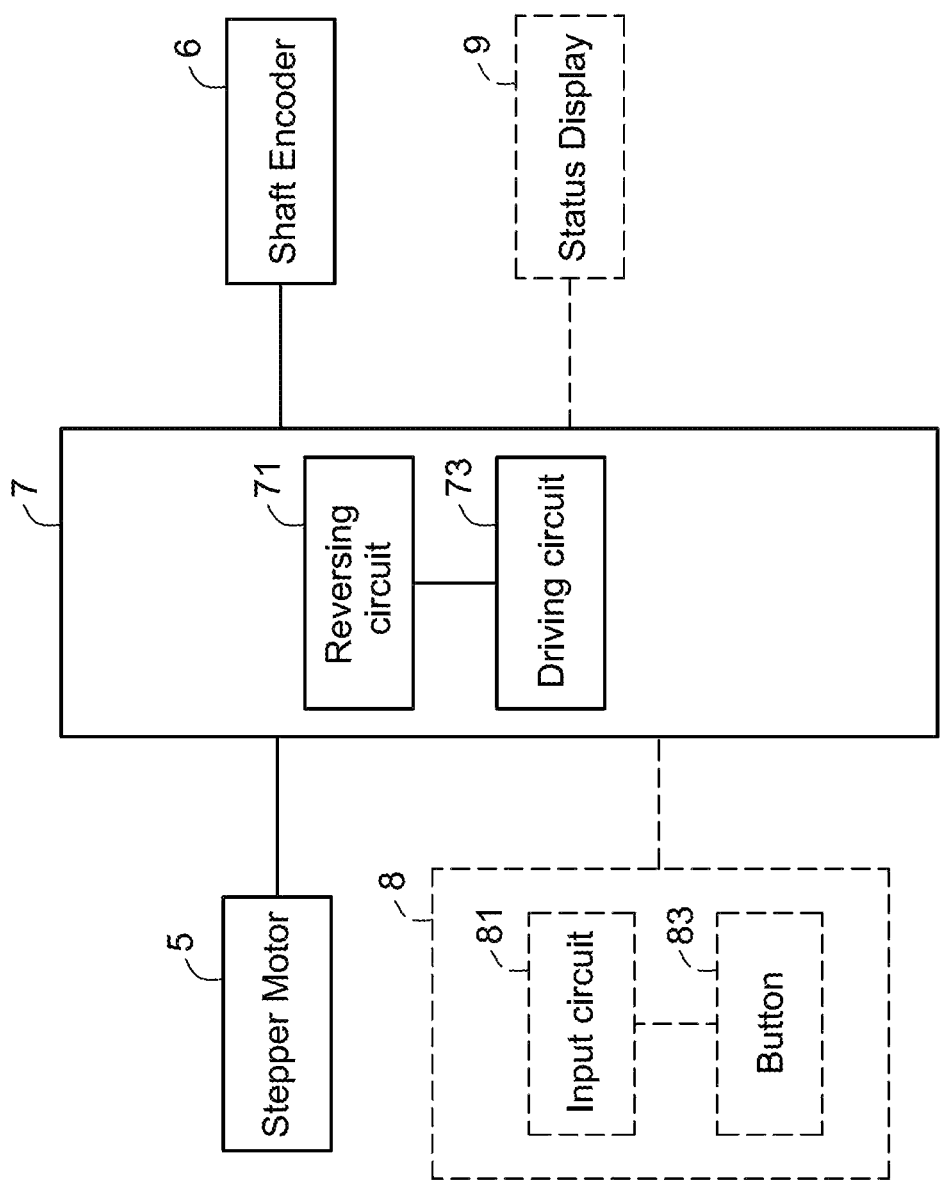
FIG. 7 shows a circuit block diagram of an embodiment of the fan oscillating control system shown in FIG. 1.

FIG. 7 shows a circuit block diagram of an embodiment of the fan oscillating control system shown in FIG. 1. Referring to FIG. 7, the controller 7 includes a reversing circuit 71 and a driving circuit 73 electrically coupled with each other.

In one embodiment, the controller 7 can be implemented by one or more of a microprocessor, a microcontroller, a digital signal processor, a microcomputer, a central processing unit, a field programmable gate array, a programmable logic device, a state machine, a logic circuit, an analog circuit, a digital circuit, and/or any processing element that operates signals based on operation instructions.

When the fan is powered on, the shaft encoder 6 can generate the status signal corresponding to the current position of the rotating shaft 2, and the reversing circuit 71 can receive and analyze the status signal. Then, the reversing circuit 71 can determine if the rotating shaft 2 deviates from the midpoint of the rotation path.

If the rotating shaft 2 is initially at the midpoint position, as shown in FIG. 4, when the fan is turned on, the driving circuit 73 can generate pulse signals to the stepper motor 5 to perform a full clockwise and counterclockwise rotation.

However, if the rotating shaft 2 deviates from the midpoint position, as shown in FIGS. 5 and 6, when the stepper motor 5 is initially started, the reversing circuit 71 can generate a reversing signal to the stepper motor 5. This allows the rotating shaft 2 to return to the midpoint position of the rotation path. Then the driving circuit 73 can generate pulse signals to the stepper motor 5 to perform a full clockwise and counterclockwise rotation.

In summary, the reversing circuit 71 can generate a reversing signal for the stepper motor 5 in response to the status signal indicating a deviation of the rotating shaft 2 from a midpoint position of the rotation path. Then, the driving circuit 73 can generate pulse signals for the stepper motor 5 according to perform a full clockwise and counterclockwise rotation within a pre-determined oscillation angle.

Figure 8:
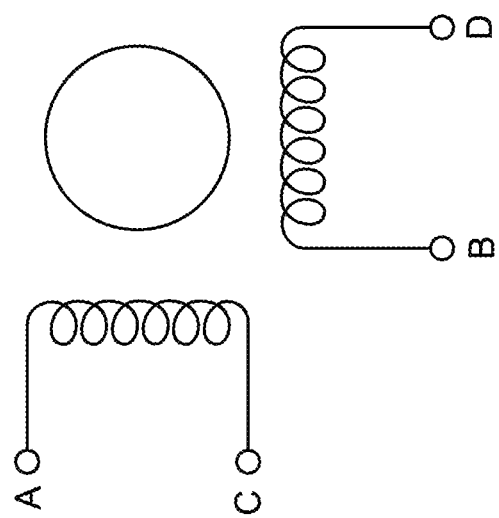
FIG. 8 shows a circuit block diagram of an embodiment of a stepper motor shown in FIG. 2.
Figure 9:
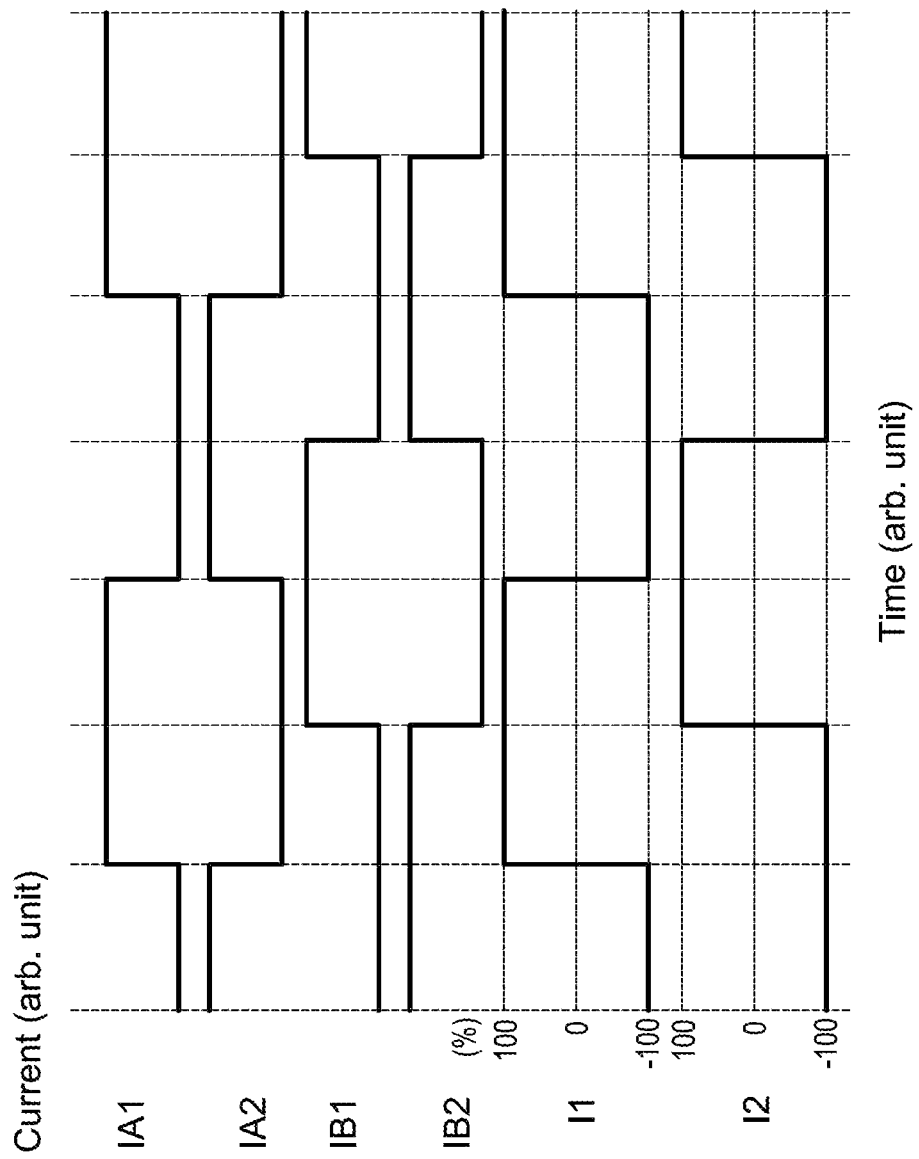
FIG. 9 shows a current-versus-time diagram depicting the operation of the stepper motor in full-step mode.
Figure 10:
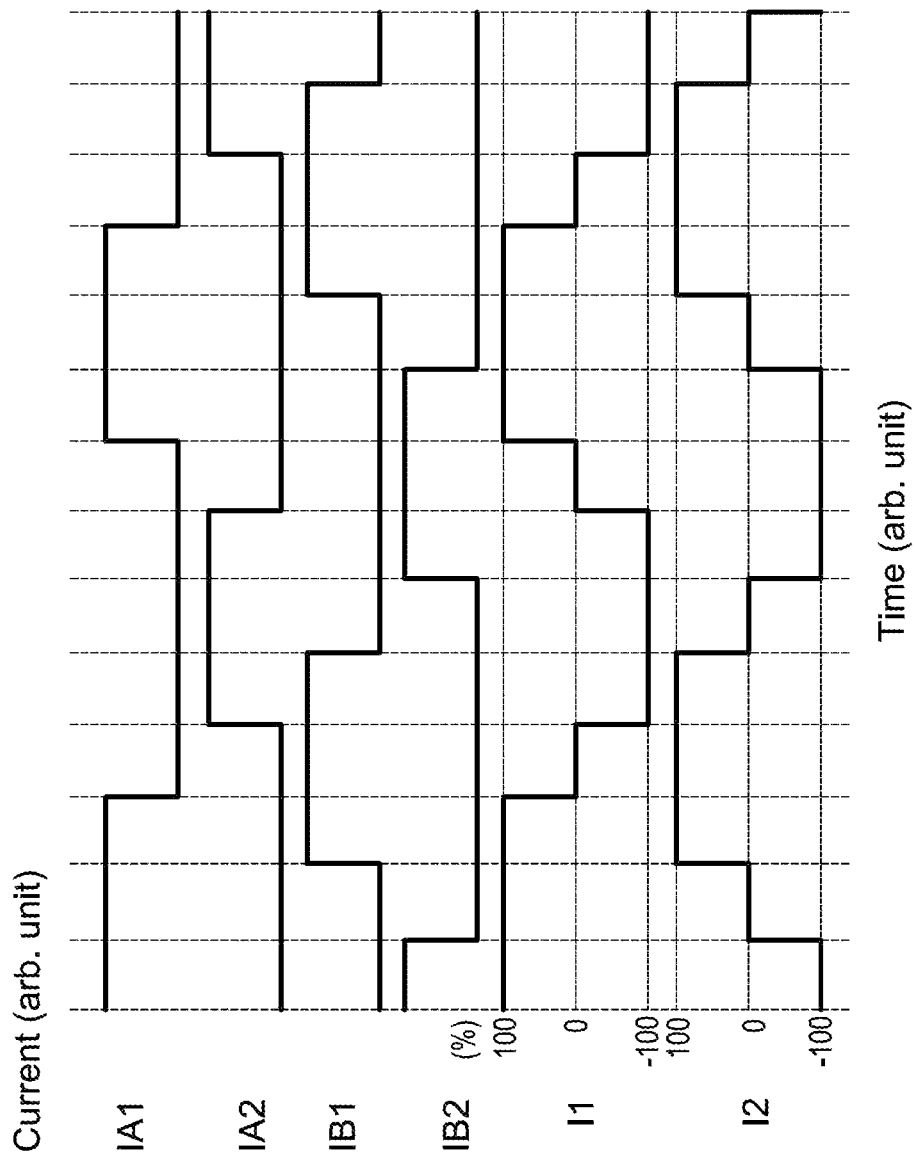
FIG. 10 shows a current-versus-time diagram depicting the operation of the stepper motor in half-step mode.

FIG. 8 shows a circuit block diagram of an embodiment of a stepper motor 5 shown in FIG. 2. FIG. 9 shows a current-versus-time diagram depicting the operation of the stepper motor 5 in full-step mode. FIG. 10 shows a current-versus-time diagram depicting the operation of the stepper motor 5 in half-step mode.

Referring to FIGS. 8 to 10 together, in this embodiment, the stepper motor 5 is driven by two-phase four-wire excitation with a 1.8-degree step angle. When the controller 7 generates pulse signals, including the electrical signal AB-BC-CD-DA, signifying a single step, the output shaft 51 of the stepper motor 5 will rotate 1.8° clockwise. Conversely, when the received pulse signals follow the sequence DA-CD-BC-AB, the output shaft 51 will rotate 1.8 degrees counterclockwise. As a result, 200 steps are required to complete a full 360-degree rotation. It is noted that this embodiment is designed, but not limited, to oscillate within a maximum angular range of 90°.

For more precise locating, the driving circuit 73 utilizes the subdivision driving control, enabling precise regulation of the stepper motor's phase current. For instance, in a two-phase stepper motor with a rated phase current of 3 A, traditional stepper motor drivers, such as those using a constant current chopper method, result in a sudden change of current from 0 A to 3 A or vice versa with each step. This substantial variation in phase current leads to inherent vibrations and noise during stepper motor operation. By contrast, employing a subdivision stepper motor driver in an 8-subdivision mode ensures that the current change in the motor's winding is only 0.375 A per micro-step.

Moreover, this change follows a sinusoidal curve pattern, significantly reducing vibration and noise. The choice of the subdivision value depends on the specific project application and should be determined based on the product's requirements. It's not that the bigger the subdivision value, the better the performance. In some embodiments, the subdivision parameter ranges from 4 to 32.

Referring to FIG. 9, when the driving circuit 73 operates in full step mode without subdividing the steps, a complete step is executed with a single input pulse, producing the entire electrical signal sequence AB-BC-CD-DA. In contrast, in half-step mode, shown in FIG. 10, a single step requires two input pulses.

In the half-step mode, the pulse transition, which corresponds to magnetic variation, is accomplished through two gradual movements. Conversely, in the full-step mode, this transition takes place instantaneously. The dissimilarity in the movement pattern prevents IA1 and IA2, or IB1 and IB2, from rapidly changing polarity. This, in effect, prevents simultaneous changes in motor coil current polarity, resulting in reduced noise from current fluctuations and mitigating vibration issues.

In this embodiment, the subdivision parameter is set to a value of 8. With this configuration, it requires 8 input pulses to complete one step and produce the AB-BC-CD-DA electrical signal. Consequently, the stepper motor 5 rotates by 0.225° (1.8°÷8=0.225°) upon receiving a single pulse. If the oscillation angle is set to 50°, meaning oscillating 22.5° clockwise and 22.5° counterclockwise, then the number of required pulses to complete a 22.5-degree clockwise rotation would be 100 pulses (22.5°÷(1.8°÷8)=100). Therefore, the driving circuit 73 can generate pulse signals for the stepper motor 5 according to the subdivision parameter and the oscillation angle. This ensures that the current for each step angle remains relatively stable, resulting in lower noise and reduced vibration due to polarity switches.

Figure 11:
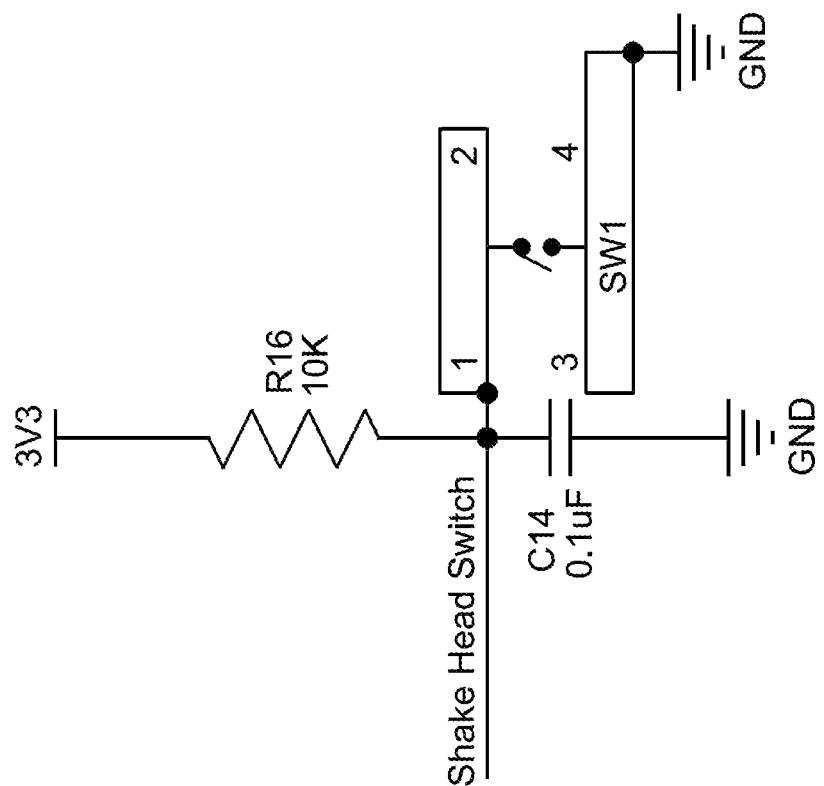
FIG. 11 shows a circuit block diagram of an embodiment of an input circuit shown in FIG. 7.

FIG. 11 shows a circuit block diagram of an embodiment of an input circuit shown in FIG. 7. Referring to FIGS. 1, 7, and 11 together, in one embodiment, the oscillating fan control system further includes a control input 8 electrically coupled to the controller 7. The control input 8 has an input circuit 81 and one or more buttons 83, as shown in FIGS. 1 and 7.

The input circuit 81 can generate the oscillation angle for a fan head 1. The oscillation angle is selected by operating the button 83 from a plurality of preset oscillation ranges. Referring to FIG. 11, when the button 83 is not pressed, the input logic level remains high. When the button 83 is pressed once, the input logic level goes low. The input circuit 81 has programmed a pre-defined relationship between low logic level signals, based on button operation count, and preset oscillation ranges.

For example, 1 low logic level instance corresponds to a 9° displacement (4.5° to the left and 4.5° to the right), 2 instances correspond to an 18° displacement (9° to the left and 9° to the right), and so on. The low logic level instances 3, 4, 5, 6, 7, 8, 9, and 10 correspond to angular displacements of 27°, 36°, 45°, 54°, 63°, 72°, 81°, and 90°, respectively.

Offering 10 levels of adjustable oscillation ranges enables users to target a more specific area that is beneficial to air circulation for plant growth, corresponding to various plant growth stages with different plant sizes. For example, the fan head 1 can oscillate only at a small range, such as 9° or 18°, as the external command indicates that the plant is quite small and needs a smaller air circulation for plant growth.

Referring to FIG. 7 again, in one embodiment, the oscillating fan control system further includes a status display 9 electrically coupled to the controller 7. The status display 9 can indicate the oscillation angle of the current operation status corresponding to the 10 levels of adjustable oscillation ranges as mentioned above. The status display 9 includes but is not limited to LED indicators or an LCD display.

Figure 12:
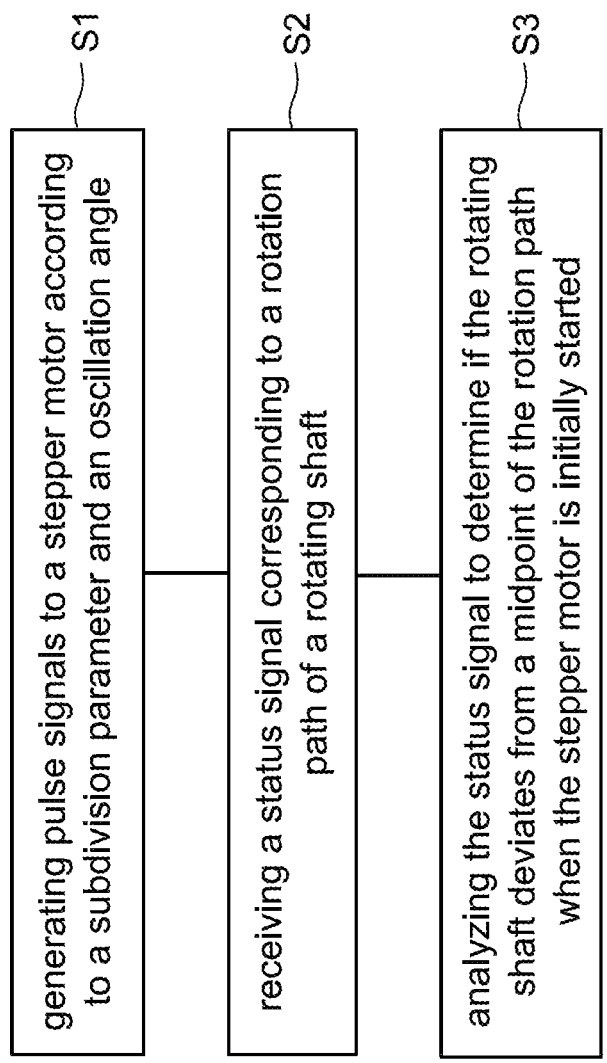
FIG. 12 shows a flowchart of an embodiment of a method for controlling an oscillating fan.

FIG. 12 shows a flowchart of an embodiment of a method for controlling an oscillating fan. The method includes:
 step S1: generating pulse signals to a stepper motor according to a subdivision parameter and an oscillation angle;
 step S2: receiving a status signal corresponding to a rotation path of a rotating shaft; and
 step S3: analyzing the status signal to determine if the rotating shaft deviates from a midpoint of the rotation path when the stepper motor is initially started.

The aforementioned steps of the methods can be implemented through one or more embodiments of the oscillating fan control system mentioned above, thus avoiding redundant repetition of the technical function, results, and advantages.

In one embodiment, the step S3 of analyzing the status signal further includes generating a reversing signal when the rotating shaft deviates from the midpoint. For example, if the rotating shaft 2 deviates from the midpoint position, as shown in FIGS. 5 and 6, the reversing circuit 71 can generate a reversing signal for the stepper motor 5 in response to the status signal indicating a deviation of the rotating shaft 2 from a midpoint position of the rotation path.

In one embodiment, the step of receiving the pulse signals further includes collecting different quadrature signals generated by two photoelectric sensors when obstructed and when unobstructed by a rotating disk. This can be implemented through one or more embodiments of the oscillating fan control system mentioned above, thus avoiding redundant repetition of the technical function, results, and advantages.

In one embodiment, the method further includes a step of receiving the oscillation angle generated by an input circuit and selected from a plurality of preset oscillation ranges. For example, referring to FIG. 11, when the button 83 is not pressed, the input logic level remains high. When the button 83 is pressed once, the input logic level goes low. The input circuit 81 has programmed a pre-defined relationship between low logic level signals, based on button operation count, and preset oscillation ranges.

Similar examples have been discussed in the previous embodiments, and they are not repeated here to avoid redundancy. This allows the oscillation range to be easily adjusted by the user, if the user wants the oscillating fan to oscillate only at a small range, instead of going through the entire oscillation range.

In one embodiment, the method further includes a step of indicating the oscillation angle by a status display as discussed above. The status display 9 can indicate the oscillation angle of the current operation status corresponding to the 10 levels of adjustable oscillation ranges as mentioned above.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

The terms and expressions used herein have the ordinary meaning accorded to such terms and expressions in their respective areas, except where specific meanings have been set forth. Relational terms such as "left" and "right" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by "a" or "an" does not, without further constraints, preclude the existence of additional elements of the identical type.

What is claimed is:

1. An oscillating fan control system comprising:
   a holder having an opening;
   a stepper motor secured to the holder and having an output shaft towards the opening;
   a rotating shaft having an end towards the opening and connected to the output shaft;
   a shaft encoder that can generate a status signal corresponding to a rotation path of the rotating shaft; and
   a controller electrically coupled to the stepper motor and the shaft encoder and comprising:
   a reversing circuit that can generate a reversing signal for the stepper motor in response to the status signal indicating a deviation of the rotating shaft from a midpoint position of the rotation path; and
   a driving circuit that can generate pulse signals for the stepper motor according to a subdivision parameter and an oscillation angle.

2. The oscillating fan control system of claim 1, wherein the shaft encoder comprises:
   a rotating disk coaxially mounted on the rotating shaft; and
   a sensor circuit comprising two photoelectric sensors spaced apart and oriented towards the rotating disk, wherein the status signal comprising different quadrature signals from each of the two photoelectric sensors when obstructed and when unobstructed by the rotating disk.

3. The oscillating fan control system of claim 1, further comprising a control input having an input circuit and a button, wherein the input circuit can generate the oscillation angle selected by operating the button from a plurality of preset oscillation ranges.

4. The oscillating fan control system of claim 3, further comprising a status display for indicating the oscillation angle.

5. The oscillating fan control system of claim 1, wherein the stepper motor is driven by a two-phase four-wire excitation, and the subdivision parameter ranges from 4 to 32.

6. A method for controlling an oscillating fan comprising:
   generating pulse signals to a stepper motor according to a subdivision parameter and an oscillation angle;
   receiving a status signal corresponding to a rotation path of a rotating shaft; and
   analyzing the status signal to determine if the rotating shaft deviates from a midpoint of the rotation path when the stepper motor is initially started.

7. The method of claim 6, wherein the step of analyzing the status signal further comprises generating a reversing signal when the rotating shaft deviates from the midpoint.

8. The method of claim 6, further comprising receiving the oscillation angle generated by an input circuit and selected from a plurality of preset oscillation ranges.

9. The method of claim 8, further comprising indicating the oscillation angle by a status display.

10. The method of claim 6, wherein the step of receiving the status signal further comprises collecting different quadrature signals generated by two photoelectric sensors when obstructed and when unobstructed by a rotating disk.

* * * * *